United States Patent
Doescher et al.

(10) Patent No.: US 10,222,449 B2
(45) Date of Patent: Mar. 5, 2019

(54) SYSTEM AND METHOD FOR DETERMINING LOCATION OF OBJECT USING RFID TAG

(71) Applicant: NXP B.V., Eindhoven (NL)

(72) Inventors: Michael Johannes Doescher, Hamburg (DE); Christine Marie Michele Calmels, Hamburg (DE)

(73) Assignee: NXP B.V., San Jose, CA (US)

( * ) Notice: Subject to any disclaimer, the term of this patent is extended or adjusted under 35 U.S.C. 154(b) by 273 days.

(21) Appl. No.: 15/379,138

(22) Filed: Dec. 14, 2016

(65) Prior Publication Data
US 2018/0165481 A1    Jun. 14, 2018

(51) Int. Cl.
| | |
|---|---|
| H04W 24/00 | (2009.01) |
| G01S 5/02 | (2010.01) |
| G06K 19/07 | (2006.01) |
| H04M 1/725 | (2006.01) |
| H04W 88/02 | (2009.01) |

(52) U.S. Cl.
CPC ........ G01S 5/0284 (2013.01); G06K 19/0707 (2013.01); *H04M 1/72519* (2013.01); *H04M 1/72522* (2013.01); *H04W 88/02* (2013.01)

(58) Field of Classification Search
CPC ........ G01S 5/0284; G01S 19/34; G01S 13/74; G06K 19/0707; G04B 1/59; H04M 1/72519; H04M 1/72511; H04W 88/02
USPC ............ 455/456.1, 456.6, 550.1; 342/357.74
See application file for complete search history.

(56) References Cited

U.S. PATENT DOCUMENTS

| | | | |
|---|---|---|---|
| 6,519,530 B2 | 2/2003 | Corckett et al. | |
| 6,750,769 B1 | 6/2004 | Smith | |
| 7,598,853 B2 | 10/2009 | Becker et al. | |
| 7,663,485 B2 | 2/2010 | Kim et al. | |
| 7,671,718 B2 | 3/2010 | Turner et al. | |
| 7,904,041 B2 | 3/2011 | Feher | |
| 8,024,012 B2 | 9/2011 | Clevenger et al. | |
| 8,653,946 B2 | 2/2014 | Bae et al. | |
| 9,489,813 B1* | 11/2016 | Beigel ................. | G08B 13/2417 |
| 9,523,775 B2* | 12/2016 | Chakraborty ........... | G01S 19/34 |
| 2011/0068921 A1* | 3/2011 | Shafer .................. | G06K 7/0008 340/571 |
| 2011/0148582 A1* | 6/2011 | Ritamaki ................ | E05B 39/02 340/10.1 |

(Continued)

FOREIGN PATENT DOCUMENTS

EP    2221748    8/2010

OTHER PUBLICATIONS

V. Talla, B. Kellogg, B. Ransford, S. Naderiparizi, S. Gollakota, J. R. Smith, "Powering the next billion devices with Wi-Fi", 2015.

(Continued)

*Primary Examiner* — Danh C Le
(74) *Attorney, Agent, or Firm* — Charles E. Bergere (57) ABSTRACT

An RFID tag is attached to or embedded in an object and used for determining the position of the object. The RFID tag includes a controller and an energy harvester coupled to the controller. The controller provides object position information to a host device by sending ping signals to the host device. The energy harvester harvests RF energy from WLANs, converts the RF energy to DC power, and supplies the DC power to the RFID tag.

12 Claims, 8 Drawing Sheets

(56) References Cited

U.S. PATENT DOCUMENTS

| | | | | |
|---|---|---|---|---|
| 2013/0173402 A1* | 7/2013 | Young | ................ | G06Q 30/0635 |
| | | | | 705/14.73 |
| 2013/0324059 A1* | 12/2013 | Lee | ...................... | H04W 52/02 |
| | | | | 455/127.1 |
| 2014/0240088 A1* | 8/2014 | Robinette | .......... | G08B 13/1427 |
| | | | | 340/5.61 |
| 2014/0324152 A1* | 10/2014 | Hollett | ...................... | A61F 2/94 |
| | | | | 623/1.11 |
| 2016/0158625 A1* | 6/2016 | DeAngelis | ......... | A63B 71/0619 |
| | | | | 340/539.13 |
| 2016/0313774 A1* | 10/2016 | Henry | .................... | G11C 17/16 |

OTHER PUBLICATIONS

AiRISTA Flow, Inc., "The Next-Generation Wi-Fi Tag for Tracking Assets", www.airista.com, 2016.

* cited by examiner

SYSTEM AND METHOD FOR DETERMINING LOCATION OF OBJECT USING RFID TAG

BACKGROUND

The present invention is directed to RFID tags and using RFID tags to locate objects.

Small gadgets such as keys, glasses, etc. are prone to being overlooked and thus people spend significant amounts of time searching for and locating these objects. Multiple positioning products currently are available to address assist in determining an objects location. Some positioning products use lights or audio signals to indicate a target objects location. Such positioning products guide the users in finding target objects by changing the volume of sounds or color, or light intensity, with the indicator changing as the positioning product gets nearer or further from the target object. Other positioning products use a GPS device to obtain GPS location information of the target objects, and convey the GPS location information to a user device. Since lights, audio signals and GPS devices consume additional amounts of power, the conventional positioning products use large antennas and batteries to supply adequate power for the positioning products to operate.

The large antennas and batteries also effect the size of the positioning devices. For example, it is not convenient or practical to attach a bulky positioning device to a small object such as a pair of glasses or a set of keys, nor would it be convenient to use a small object with a bulky positioning device attached to it.

Accordingly, it would be advantageous to have an object position locating device that consumes less power, takes up less space, and does not require a large or bulky receiver/transmitter on the object to be located.

SUMMARY

A RFID tag for indicating the position of an object, and a system and method for determining the position of an object using the RFID tag are described herein.

An RFID tag is attached to or embedded into an object and used for determining a location of the object. The RFID tag includes a controller and an energy harvester coupled to the controller. The controller provides position information of the object to a host device by sending a plurality of ping signals to the host device. The energy harvester harvests RF energy from radio signals, converts the RF energy to DC power, and supplies the DC power to the RFID tag.

A system determines a position of the object using a host device. The host device performs a pairing operation with the RFID tag, sends a plurality of search signals to the RFID tag from different locations, receives a plurality of ping signals from the RFID tag, and determines the position of the object based on the received ping signals.

A method for determining a position of an object that has the RFID tag attached to or embedded therein includes performing a pairing operation with the RFID tag, sending a plurality of search signals to the RFID tag from different locations, receiving a plurality of ping signals from the RFID tag, and determining the position of the object using the received ping signals.

The above features, and other features and advantages will be readily apparent from the following detailed description when taken in connection with the accompanying drawings.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION

Figure 1:
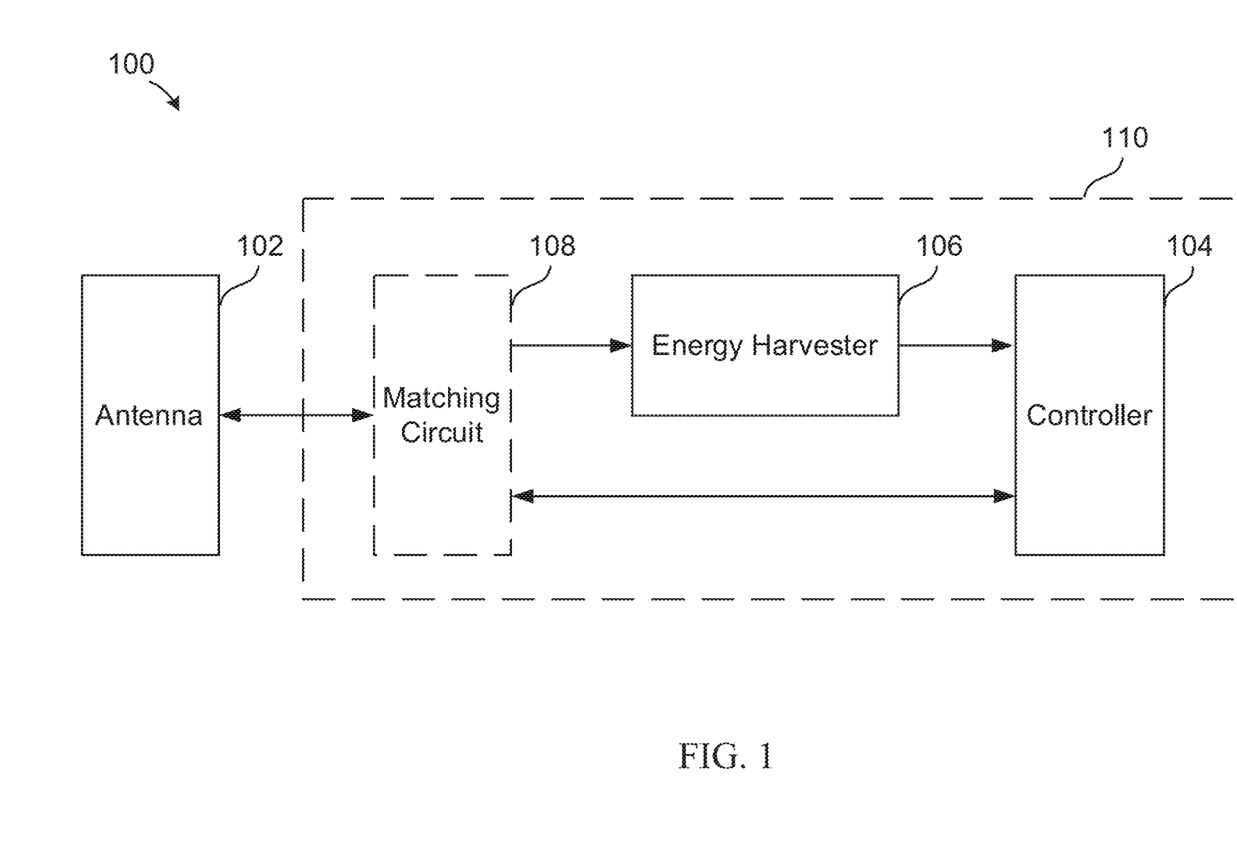
FIG. 1 is a schematic block diagram of a RFID tag for indicating the position of an object in accordance with an exemplary embodiment of the present invention.

Referring now to FIG. 1, a schematic block diagram of a RFID tag 100 for determining the position of an object in accordance with an exemplary embodiment of the present invention is shown. The RFID tag 100 includes an antenna 102, a controller 104, and an energy harvester 106. The RFID tag 100 may be attached to or embedded in the object.

The RFID tag 100 uses the antenna 102 to receive signals from an external device and transmit signals back to the external device. Antennas that receive and transmit signals from/to external devices are known in the art and thus further description of this function of the antenna 102 is not necessary for a complete understanding of the present invention. The antenna 102 also receives electro-magnetic energy from electro-magnetic fields generated near to the antenna 102, and the energy harvester 106 harvests energy from the electro-magnetic energy. Antennas for Near Field Communications that can transmit and receive signals are generally known, such as from U.S. Pat. No. 9,331,378 of Merlin et al., and assigned to NXP BV, the contents of which is herein incorporated by reference.

The controller 104 may be a microcontroller or a state machine. The controller 104 controls operations of the RFID tag 100. Specifically, the controller 104 provides position information of the attached object to a host device by sending a plurality of ping signals to the host device. The controller 104 also controls the signaling, as well as other parts of the RFID tag 100, as will be explained in more detail below.

The energy harvester 106 is coupled to the antenna 102 and the controller 104, and harvests electro-magnetic energy from electro-magnetic fields. The electro-magnetic fields may be generated by, for instance, a Wireless Local Area Network (WLAN). WLANs are well known and are becoming ubiquitous and thus an ideal source for harvesting low power energy. Energy harvesters that harvest energy from WLANs are known, such as from "Powering the Next Billion Devices with Wi-Fi" of Vamsi et al. located at www.arXiv.org.

The energy harvester 106 converts electro-magnetic energy to DC power, and supplies the DC power to the controller 104. The energy harvester 106 also may be coupled to one or more other components of the RFID tag 100 and supply the DC power to such components as necessary, such as the antenna 102 or a transponder. A matching circuit 108 may be coupled between the antenna 102 and the energy harvester 106. The matching circuit 108 implements impendence and phase matching and tuning, which is known by those of skill in the art and the present invention is not limited to any one specific implementation. The energy harvester 106 also may supply the DC power to the matching circuit 108 as necessary.

In an exemplary embodiment, the controller 104 and the energy harvester 106 are integrated on an integrated circuit 110. One or more other components of the RFID tag 100 such as the matching circuit 108 may also be integrated on the integrated circuit 110. As compared with conventional positioning products, integrating the energy harvester 106 with other parts of the RFID tag 100 onto a single integrated circuit 110 makes the RFID tag 100 more compact.

Figure 2:
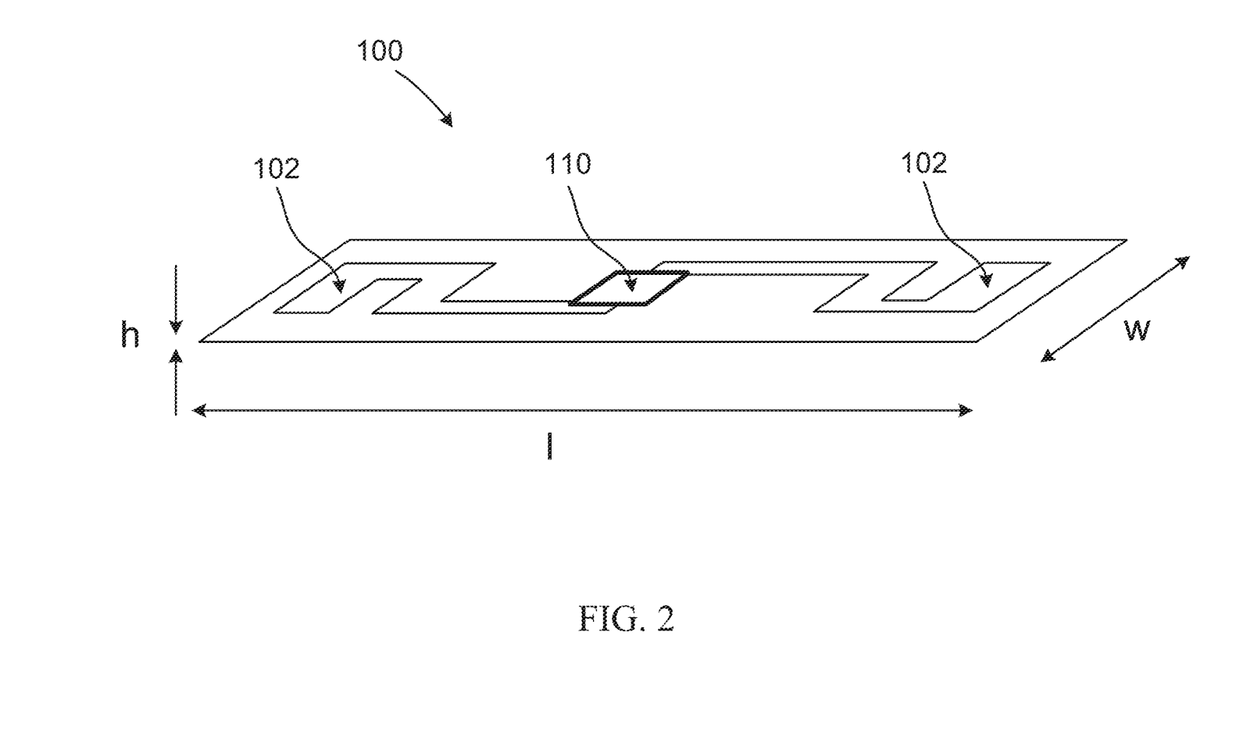
FIG. 2 is a schematic diagram of the RFID tag of FIG. 1 in accordance with an embodiment of the present invention.

FIG. 2 is a schematic diagram of the RFID tag 100 illustrating that the energy harvester 106 is integrated with other components of the RFID tag 100 on the integrated circuit 110, and the integrated circuit 110 is coupled to the antenna 102. The RFID tag 100 may contain an antenna for both receiving and transmitting signals, or the RFID tag 100 may contain two antennas respectively for receiving and transmitting signals.

In an exemplary embodiment, the RFID tag 100 functions using only the power supplied by the energy harvester 106. That means the RFID tag 100 does not need to be equipped with a battery, which allows the RFID tag 100 to be very compact. Since the RFID tag 100 can provide location or position information of an object to the host device by sending only a plurality of ping signals to the host device, the RFID tag 100 consumes less power than conventional positioning products, which use lights, audio elements or GPS circuitry. Therefore, the power supplied by the energy harvester 106, harvesting from WLANs, is sufficient to support operations of the RFID tag 100. For this reason, it is not necessary for the RFID tag 100 to be equipped with batteries. Thus, the RFID tag 100 is compact enough to be embedded into an object. For example, in one embodiment, the RFID tag 100 is about 20 mm×2 mm×0.1 mm.

Figure 3:
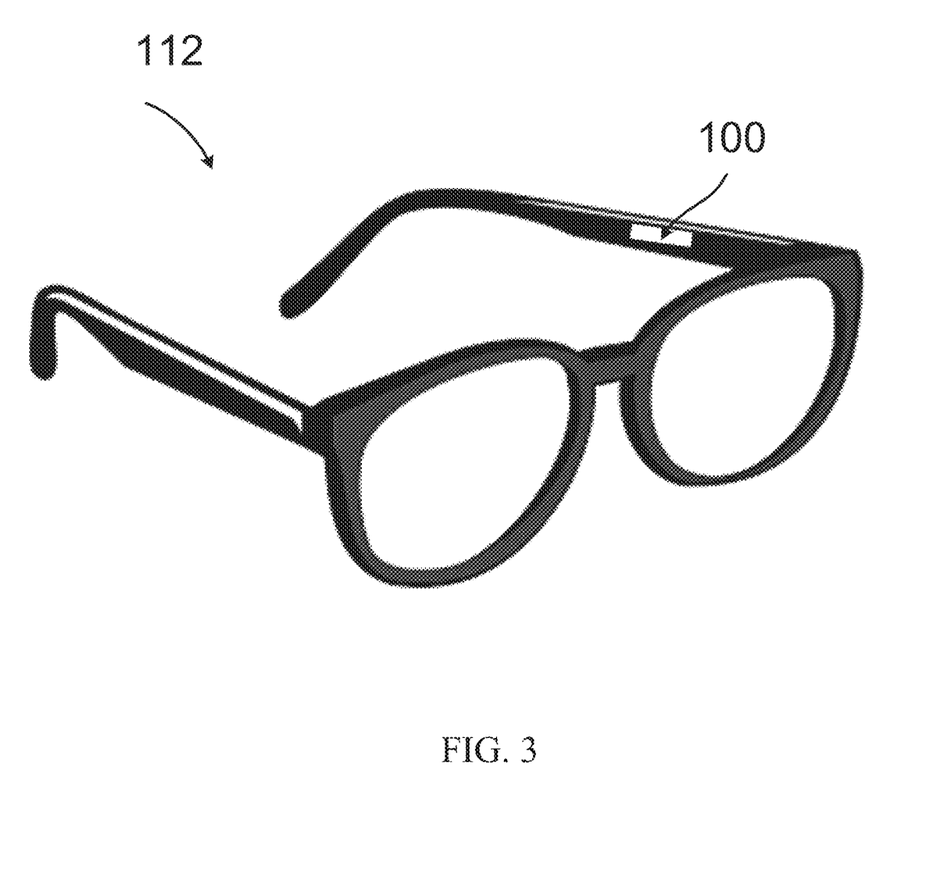
FIG. 3 is an isometric view of a pair of glasses to which the RFID tag of FIG. 1 is attached.

As shown in FIG. 3, in one example embodiment, the RFID tag 100 is embedded into the frame of a pair of glasses 112 and is used to locate the glasses 112. Because the RFID tag 100 is so small and relatively flat, users of the glasses would not be bothered by the RFID tag 100 when they are wearing the glasses 112. Thus, the RFIG tag 100 with such compact characteristics improves a user's comfort level as compared with the conventional, bulky location detection devices.

In an exemplary embodiment, the RFID tag 100 operates in a frequency range between 2 GHz and 5 GHz. WLAN signals in this frequency range are (or are becoming) essentially ubiquitous so that it is easy for the RFID tag 100 to obtain power almost anywhere. Further, WLAN signals in this frequency range have the additional benefit of being able to operate with antennas in a geometrical dimension of cm, hence offering a small form factor for the RFID tag 100. The present invention is preferably, but not limited to 2.4 GHz or 5 GHz.

Figure 4:
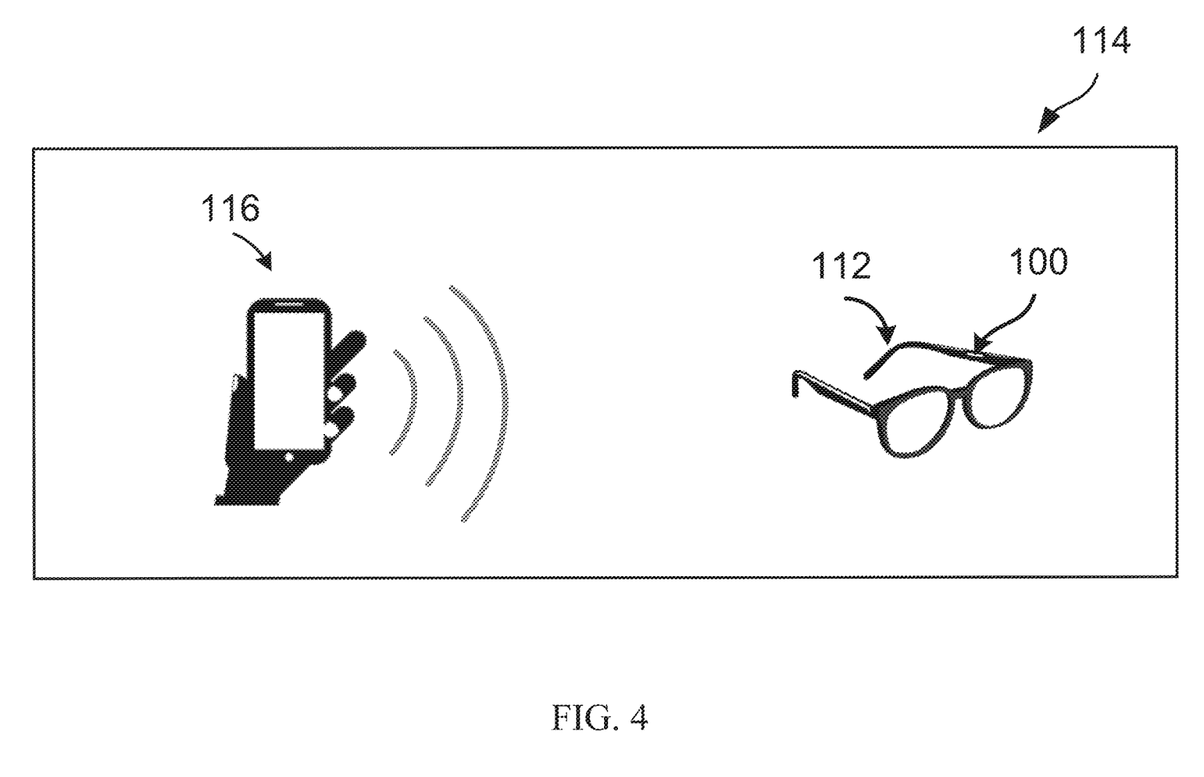
FIG. 4 is a diagram illustrating a system for determining the position of an object in accordance with an exemplary embodiment of the present invention.

FIG. 4 is a schematic diagram of a system 114 for determining the location of the glasses 112 in accordance with an exemplary embodiment of the invention. The system 114 includes the RFID tag embedded in or attached to the frame of the glasses 112 and a host device 116. The host device 116 may be implemented by a hand-held electronic device such as a mobile phone.

Figure 5:
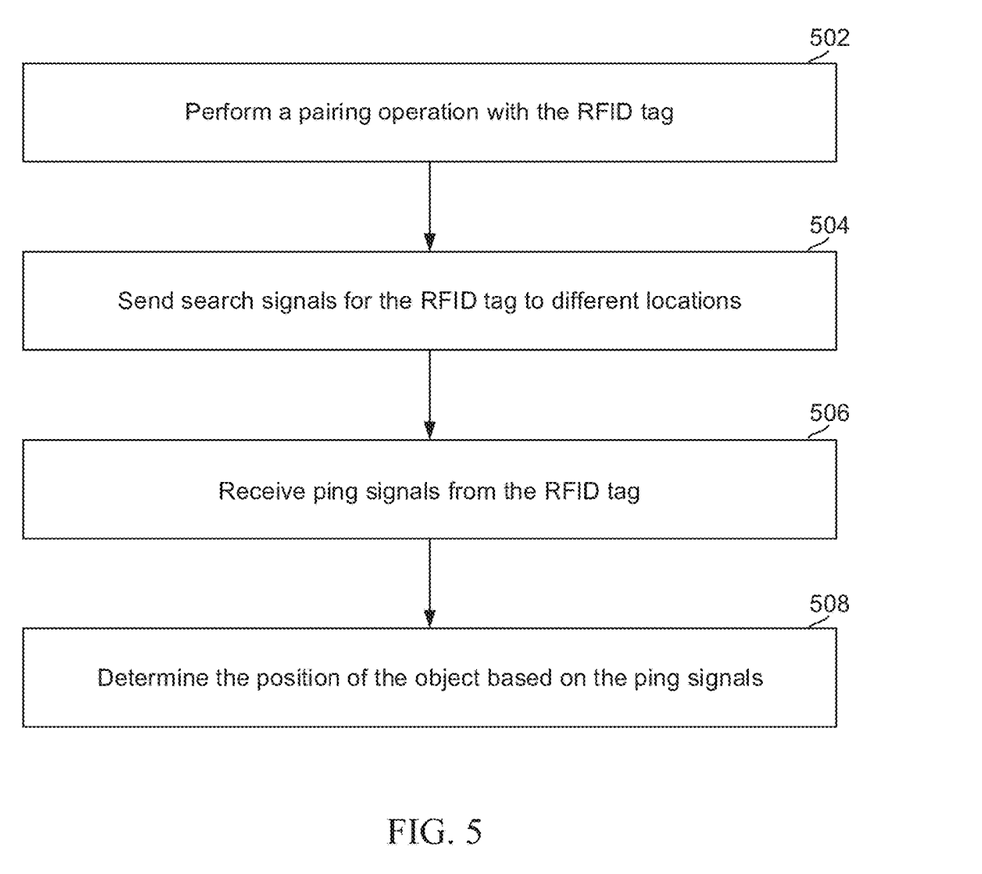
FIG. 5 is a flow chart of a method for determining the position of an object in accordance with an exemplary embodiment of the present invention.

Hereinafter, operation of the system 114 will be described in detail with reference to FIGS. 5-6. FIG. 5 is a flow chart of a method for determining a position of an object in accordance with an exemplary embodiment; and FIGS. 6A-6D are schematic diagrams illustrating of processes among the host device 116, a RFID tag 100a embedding into the glasses 112 and a RFID tag 100b attaching to a key 118.

In an exemplary embodiment shown in FIGS. 6A-6D, the RFID tag 100a is embedded into the frame of the glasses 112, and the RFID tag 100b is attached to or embedded into the key 118. Although a key 118 is shown, it will be understood by those of skill in the art that the RFID tag 100b could be attached to or embedded in a key chain to which the key 118 is attached. Before the host device 116 sends a plurality of search signals, the host device 116 performs a pairing operation with the RFID tag 100a and the RFID tag 100b (step 502). The host device 116 need only perform the pairing operation with an RFID tag once.

When the host device 116 performs the pairing operation with the RFID tag 100a/100b, the host device 116 reads a UID (unique ID) from the RFID tag. The UID may be identified by a user with a user-defined name in the host device 116. For example, the user may set the user-defined name related to the UID of the RFID tag 100a as "my glasses", and the user-defined name related to the UID of the RFID tag 100b as "my key", which makes it easier for the user to identify the corresponding object. When the user wants to look for a specific object, the host device 116 displays the user-defined names of the tagged objects and the user then selects the object that he/she is looking for from the list of user-defined names.

Figure 6A:
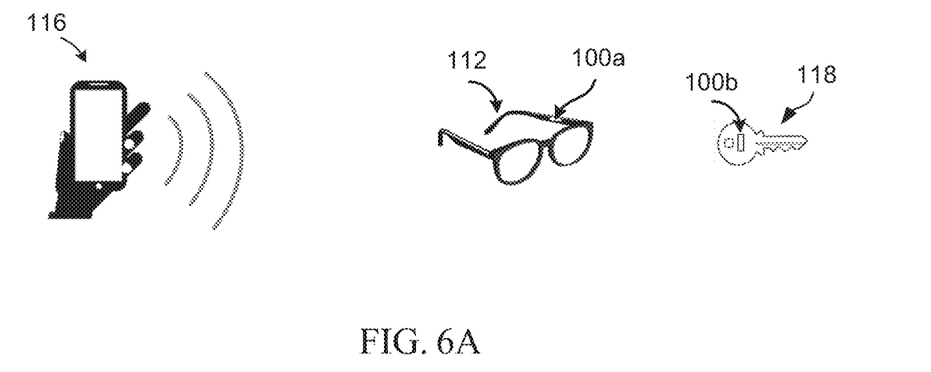
FIGS. 6A-6D are diagrams illustrating interactions between an object location determining device and an object being located, in accordance with exemplary embodiments of the present invention.
Figure 6B:
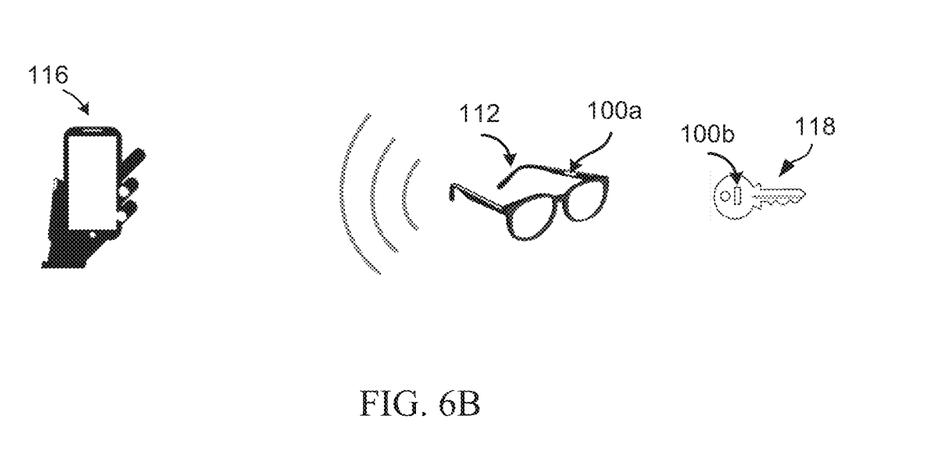
Figure 6C:
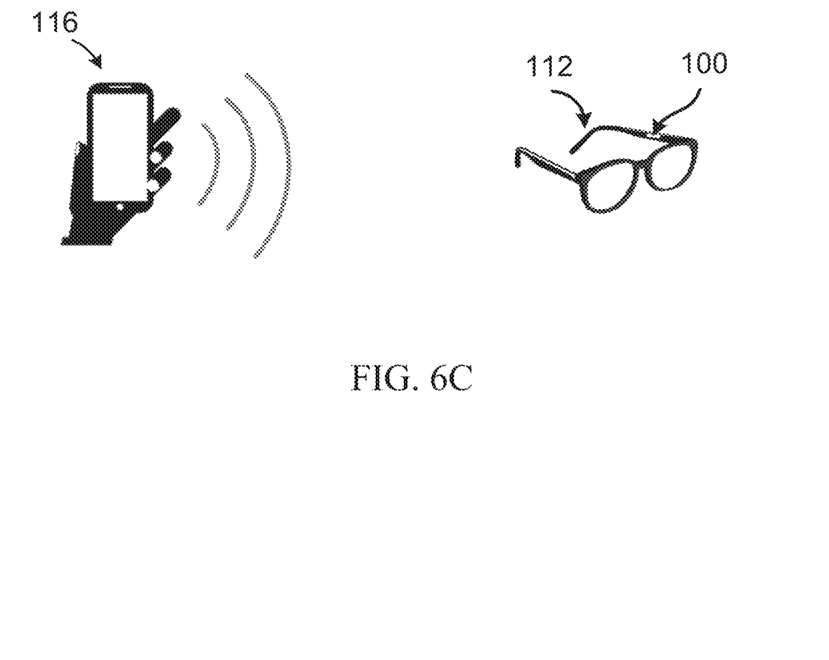
Figure 6D:
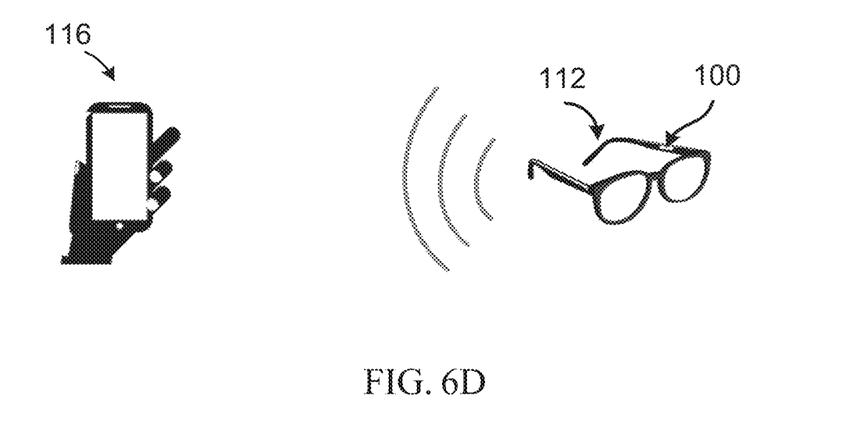
Figure 7:
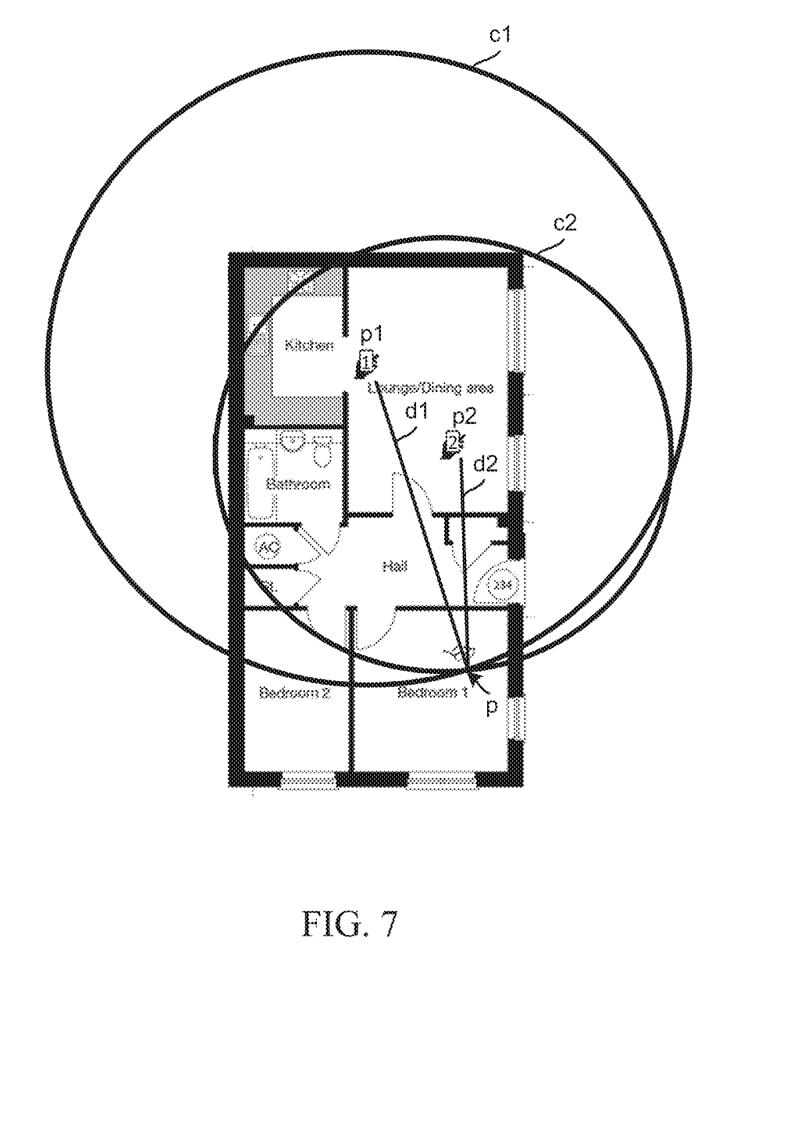
FIG. 7 is schematic diagram illustrating of an object position determination procedure in accordance with an embodiment of the present invention.

Then, the host device 116 sends a plurality of search signals with respect to the selected RFID tag 100 from different locations (step 504). In the embodiment shown in FIGS. 6A-6D and FIG. 7, the user is in a dining area and wants to find the glasses 112, which happen to be in a bedroom. FIG. 6A and FIG. 7 show the host device 116 sending a first search signal with respect to the RFID tag 100a from a first location p1, and the RFID tag 100a responds by sending a first ping signal to the host device 116 (step 506), as shown in FIG. 6B. Since the first search signal contains the UID of the RFID tag 100a, only the RFID tag 100a responds to the first search signal. That is, the RFID tag 100b does not respond to the first search signal.

After the host device 116 receives the first ping signal from the RFID tag 100a, the user moves the host device 116 to a second location p2, as shown in FIG. 7. For example, the user may move the host device 116 a few meters from the first location p1 in the dining area. At the second location p2, the host device 116 sends a second search signal with respect to the RFID tag 100 as shown in FIG. 6C, and receives a second ping signal back from the RFID tag 100a as shown in FIG. 6D. While FIG. 7 illustrates sending two ping signals from two locations (p1 and p2), it will be understood by those of skill in the art that additional ping signals may be sent from additional different locations and that the use of even one additional ping signal (e.g., a p3 signal, and an additional circle c3, not shown in FIG. 7), would improve accuracy and reduce ambiguity.

The host device 116 determines the position of the glasses 112 using the plurality of ping signals (step 508). In an exemplary embodiment, the host device 116 determines a transmission time sum of the first search signal and the first ping signal between the first location p1 and the RFID tag 100a as a first time t1, and a transmission time sum of the second search signal and the second ping signal between the second location p2 and the RFID tag 100a as a second time t2.

The host device 116 determines the first time t1 by subtracting acknowledge time ta of the RFID tag 100a from the time from sending the first search signal to receiving the first ping signal, and determines the second time t2 by subtracting the acknowledge time ta of the RFID tag 100a from the time from sending the second search signal to receiving the second ping signal.

In an exemplary embodiment, the acknowledge time ta of the RFID tag 100a is determined when the host device 116 performs the pairing operation with the RFID tag 100a. A specific distance is set between the host device 116 and the RFID tag 100a. The host device 116 sends a search signal and receives a ping signal back from the RFID tag 100a. During this signal transmission process, the time from sending the search signal to receiving the ping signal is counted by the host device 116. The specific distance divided by the signal transmission velocity vt is a transmission time sum of the search signal and the ping signal between the host device 116 and the RFID tag 100a. Thus, the acknowledge time to of the RFID tag 100a can be obtained by subtracting transmission time sum of the search signal and the ping signal from the time from sending the search signal to receiving the ping signal.

The host device 116 obtains a first distance d1 from the first time t1 and a signal transmission velocity vt, and a second distance d2 from the second time t2 and the signal transmission velocity vt. Specifically, $d1=t1*vt/2$, and $d2=t2*vt/2$.

As shown in FIG. 7, a first circle c1 is formed using the first location p1 as a center of the first circle c1 and the first distance d1 as a radius of the first circle c1. A second circle c2 is formed using the second location p2 as a center of the second circle c2 and the second distance d2 as a radius of the second circle c2. The glasses 112 are located at the intersection of the first and second circles c1 and c2. Thus, the host device 116 determines the position of the cross-point p of the first and second circles c1 and c2, which is within the apartment, as the position of the glasses 112.

The host device 116 may display an indication of direction and distance between the host device 116 and the RFID tag 100a based on the position of the glasses 112 as determined above. The host device 116 also may display the position of the glasses 112.

In the present invention, the RFID tag can provide object position information to the host device by sending the ping signals to the host device. Thus, the RFID tag does not need a GPS device to obtain GPS location information of the object or data from different WiFi access points. In addition, since the host device can determine the position of the object using the received ping signals and the position of the object can be displayed on the host device, the RFID tag does not need to be equipped with lights or audio elements to guide the user to the object. Accordingly, the RFID tag of the present invention consumes less power and also does not need to be equipped with batteries. Thus, as compared with conventional positioning products that use lights, audio elements, GPS circuitry, large antennas and batteries, the RFID tag of the present invention is more compact and more suitable for attachment to or being embedded in small devices such as keys, glasses, etc.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, the words 'comprising' and 'having' do not exclude the presence of other elements or steps then those listed in a claim. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A system for determining a position of an object, the system comprising:
   a RFID tag attached to or embedded within the object, wherein the RFID tag includes:
      a controller that transmits a plurality of ping signals that indicate a position of the object, and
      an energy harvester coupled to the controller, wherein the energy harvester harvests electro-magnetic energy from electro-magnetic fields, converts the RF energy to DC power, and supplies the DC power to the controller; and
   a host device that:
      performs a pairing operation with the RFID tag, sends, to the RFID tag, from different locations, a plurality of search signals,
      receives the plurality of ping signals from the RFID tag in response to the search signals, and
      determines the position of the object using the plurality of ping signals.

2. The system of claim 1, wherein:
   the host device sends a first search signal for the RFID tag from a first location, and receives a first ping signal from the RFID tag,
   after receiving the first ping signal, the host device moves to a second location and sends a second search signal from the second location to the RFID tag, and receives a second ping signal from the RFID tag.

3. The system of claim 2, wherein the host device:
   determines a transmission time sum of the first search signal and the first ping signal between the first location and the RFID tag as a first time, and a transmission time sum of the second search signal and the second ping signal between the second location and the RFID tag as a second time;
   obtains a first distance from the object by multiplying one-half times the first time and times a signal transmission velocity, and obtains a second distance from the object by multiplying one-half times the second time and times the signal transmission velocity; and determines a position of a cross-point of a first circle and a second circle as the position of the object, wherein the first circle is formed using the first location as a center of the first circle and the first distance as a radius of the first circle, and the second circle is formed using the second location as a center of the second circle and the second distance as a radius of the second circle.

4. The system of claim 3, wherein the host device determines the first time by subtracting an acknowledge time of the RFID tag from a time from sending the first search signal to receiving the first ping signal, and determines the second time by subtracting the acknowledge time of the RFID tag from the time from sending the second search signal to receiving the second ping signal.

5. The system of claim 1, wherein:

the host device performs the pairing operation with the RFID tag before sending the plurality of search signals; and the host device performs the pairing operation with the RFID tag once with respect to an identical object.

6. The system of claim 1, wherein when the host device performs the pairing operation, the host device reads a UID (unique ID) from the RFID tag, and the UID is associated with a user-defined name for the object in the host device.

7. The system of claim 1, wherein the host device displays a direction and a distance from the host device to the object based on the position of the object.

8. A method for determining a position of an object, wherein the object includes an embedded a RFID tag, the method comprising:

performing a pairing operation between a host device and the RFID tag;

sending by the host device, from a plurality of locations, a plurality of search signals;

receiving a plurality of ping signals from the RFID tag; and determining the position of the object based on the received ping signals.

9. The method of claim 8, further comprising:

the host device sending a first search signal to the RFID tag from a first location;

the host device receiving a first ping signal from the RFID tag;

the host device moving to a second location and sending a second search signal to the RFID tag from the second location; and the host device receiving a second ping signal from the RFID tag.

10. The method of claim 9, further comprising:

the host device determining a transmission time sum of the first search signal and the first ping signal between the first location and the RFID tag as a first time, and a transmission time sum of the second search signal and the second ping signal between the second location and the RFID tag as a second time;

the host device obtaining a first distance by multiplying the first time by a signal transmission velocity, and a second distance by multiplying the second time by the signal transmission velocity; and the host device determining a position of a cross-point of a first circle and a second circle as the position of the object, wherein the first circle is formed using the first location as a center of the first circle and the first distance as a radius of the first circle, and the second circle is formed using the second location as a center of the second circle and the second distance as a radius of the second circle.

11. The method of claim 10, wherein the host device:

determines the first time by subtracting an acknowledge time of the RFID tag from a time from sending the first search signal to receiving the first ping signal; and determines the second time by subtracting the acknowledge time of the RFID tag from the time from sending the second search signal to receiving the second ping signal.

12. The method of claim 8, further comprising displaying, by the host device, an indication of a direction and a distance from the host device to the RFID tag.

* * * * *